United States Patent
Nihei et al.

(10) Patent No.: US 9,128,816 B2
(45) Date of Patent: Sep. 8, 2015

(54) VEHICLE OPERATION METHOD PRESENTATION DEVICE AND METHOD, AND VEHICLE CONTROL DEVICE

(71) Applicant: Toyota Jidosha Kabushiki Kaisha, Toyota-shi (JP)

(72) Inventors: Toshihisa Nihei, Mishima (JP); Yasushi Kobayashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/863,836

(22) Filed: Apr. 16, 2013

(65) Prior Publication Data

US 2013/0226428 A1    Aug. 29, 2013

Related U.S. Application Data

(62) Division of application No. 12/738,301, filed as application No. PCT/IB2008/002945 on Nov. 4, 2008, now Pat. No. 8,447,460.

(30) Foreign Application Priority Data

Nov. 20, 2007    (JP) ................................. 2007-300933

(51) Int. Cl.
*G06F 7/70* (2006.01)
*G06F 19/00* (2011.01)
(Continued)

(52) U.S. Cl.
CPC ............ *G06F 17/00* (2013.01); *B60K 23/0808* (2013.01); *B60W 10/06* (2013.01);
(Continued)

(58) Field of Classification Search
CPC ......... G06F 17/00; F16H 63/42; F16H 59/08; B60W 50/14; B60W 50/082; B60W 30/18009; B60W 10/184; B60W 10/14; B60W 10/11; B60W 10/06; B60K 23/0808
USPC .......................................................... 701/70
See application file for complete search history.

(56) References Cited

U.S. PATENT DOCUMENTS

| | | | |
|---|---|---|---|
| 6,253,122 B1 | 6/2001 | Razavi et al. | |
| 2005/0004732 A1* | 1/2005 | Berry et al. | ...................... 701/48 |

FOREIGN PATENT DOCUMENTS

| | | |
|---|---|---|
| EP | 1 775 501 A1 | 4/2007 |
| GB | 2 403 027 | 12/2004 |

(Continued)

OTHER PUBLICATIONS

Office Action issued Jun. 28, 2011 in Russia Application No. 2010120129 (With English Translation).

(Continued)

*Primary Examiner* — Maceeh Anwari
(74) *Attorney, Agent, or Firm* — Oblon, McClelland, Maier & Neustadt, L.L.P.

(57) ABSTRACT

A control state of the vehicle is switched upon operation of a control switch. Besides, a mode of travel for a travel of a vehicle is selected by operation of a travel mode selection portion. Then, it is determined whether the recommended control state recommended for the selected mode of travel and the actual control state are the same. If it is determined that they are not the same, that is, that there is a deviation between the recommended control state and the actual control state, an operation method for a control switch for realizing the control state recommended for the selected mode of travel is presented to a driver.

7 Claims, 9 Drawing Sheets

(51) Int. Cl.
*G06G 7/00* (2006.01)
*G06G 7/76* (2006.01)
*G06F 17/00* (2006.01)
*B60K 23/08* (2006.01)
*B60W 10/06* (2006.01)
*B60W 10/11* (2012.01)
*B60W 10/14* (2012.01)
*B60W 10/184* (2012.01)
*B60W 30/18* (2012.01)
*B60W 50/08* (2012.01)
*B60W 50/14* (2012.01)
*F16H 59/08* (2006.01)
*F16H 63/42* (2006.01)
*F16H 59/02* (2006.01)

(52) U.S. Cl.
CPC .............. *B60W 10/11* (2013.01); *B60W 10/14* (2013.01); *B60W 10/184* (2013.01); *B60W 30/18009* (2013.01); *B60W 50/082* (2013.01); *B60W 50/14* (2013.01); *F16H 59/08* (2013.01); *F16H 63/42* (2013.01); *B60K 2350/962* (2013.01); *F16H 2059/0221* (2013.01); *F16H 2059/082* (2013.01); *F16H 2063/426* (2013.01)

(56) References Cited

FOREIGN PATENT DOCUMENTS

| | | |
|---|---|---|
| JP | 1-114531 A | 5/1989 |
| JP | 5-170000 A | 7/1993 |
| JP | 6-96372 B2 | 11/1994 |
| JP | 10-103506 | 4/1998 |
| JP | 11-344109 | 12/1999 |
| JP | 2001-52286 | 2/2001 |
| JP | 2003-254764 | 9/2003 |
| JP | 2006-76415 | 3/2006 |
| JP | 2006-152912 A | 6/2006 |
| RU | 2 102 258 C1 | 1/1998 |

OTHER PUBLICATIONS

Japanese Office Action issued on Jun. 5, 2012, in patent Application No. 2010-015747 with English Translation.

* cited by examiner

FIG. 5

| MODE | RECOMMENDED DRIVE | INPUT DATA STATE | DISPLAY CONTENT |
|---|---|---|---|
| DEEP SNOW/ MUD ROAD | H4L | L4 STATE SIGNAL IS ON OR CENTER DIFFERENTIAL LOCK STATE SIGNAL IS OFF OR REAR DIFFERENTIAL LOCK STATE SIGNAL IS ON | SELECT H4L |
| DESERT | H4L | L4 STATE SIGNAL IS ON OR CENTER DIFFERENTIAL LOCK STATE SIGNAL IS OFF OR REAR DIFFERENTIAL LOCK STATE SIGNAL IS ON | SELECT H4L |
| SNOW/SAND/MUD CLIMB | L4L | L4 STATE SIGNAL IS OFF OR CENTER DIFFERENTIAL LOCK STATE SIGNAL IS OFF OR REAR DIFFERENTIAL LOCK STATE SIGNAL IS ON | SELECT L4L |
| SNOW BUMPS | L4L | L4 STATE SIGNAL IS OFF OR CENTER DIFFERENTIAL LOCK STATE SIGNAL IS OFF OR REAR DIFFERENTIAL LOCK STATE SIGNAL IS ON | SELECT L4L |
| ROCK/STONE | L4L&Rr DIFFERENTIAL LOCK | L4 STATE SIGNAL IS OFF OR CENTER DIFFERENTIAL LOCK STATE SIGNAL IS OFF OR REAR DIFFERENTIAL LOCK STATE SIGNAL IS OFF | SELECT L4L SELECT Rr DIFFERENTIAL LOCK |

FIG. 6

| BLINKING INDICATOR | | INPUT DATA STATE | DISPLAY CONTENT |
|---|---|---|---|
| CENTER DIFFERENTIAL LOCK | ⊤×⊥ | DL INDICATOR BLINKING REQUEST IS ON | ACCELERATE, OR DECELERATE, OR REVERSE VEHICLE |
| 4LO | 4LO | L4 INDICATOR BLINKING REQUEST IS ON | STOP VEHICLE, AND SHIFT AT LEVER TO N |
| Rr DIFFERENTIAL LOCK | ⊤×⊥ | L4 STATE IS ON AND CENTER DL STATE IS ON AND Rr DIFFERENTIAL LOCK INDICATOR BLINKING REQUEST IS ON | SLIGHTLY MOVE VEHICLE STRAIGHT, AND STOP VEHICLE |

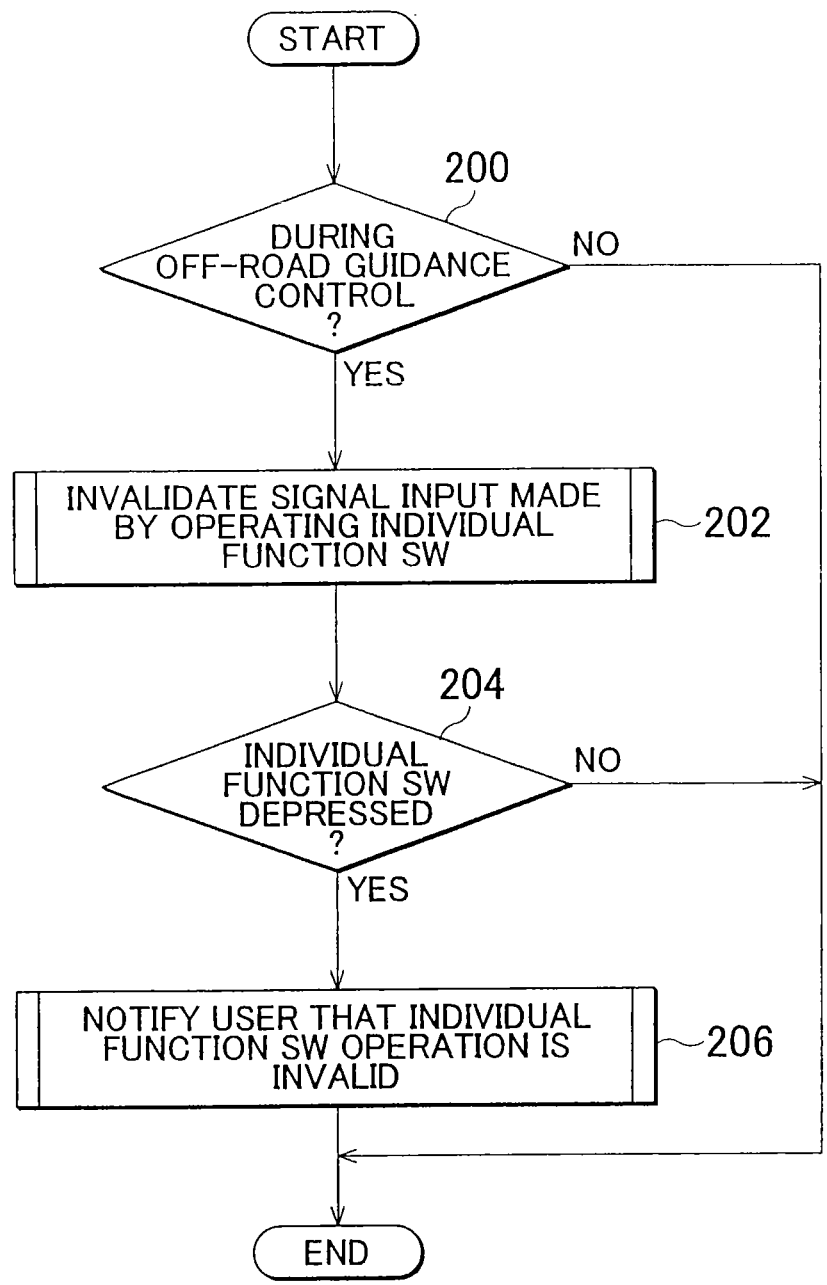

FIG. 9

| INDIVIDUAL SW | | INPUT DATA STATE | DISPLAY CONTENT |
|---|---|---|---|
| VSC | | VSC SWITCH OPERATION PROHIBITION INFORMATION IS ON | THE SWITCH CANNOT BE OPERATED, AS OFF-ROAD GUIDANCE IS ON |
| A-TRC | | 2nd START SERVICE PROHIBITION INFORMATION IS ON | |
| 2nd START | | | |
| AVS | | INFORMATION ABOUT ANY ONE OF AVS SWITCHES IS ON | |
| CRAWL MAIN | H4 | CRAWL SWITCH ON/OFF INFORMATION IS ON | THE SWITCH CANNOT BE OPERATED, AS L4 MODE IS NOT SELECTED |
| | L4 | | — |
| CRAWL DIAL | | ONE OF INFORMATION PIECES ABOUT CRAWL SWITCH SPEED IS ON | THE SWITCH CANNOT BE OPERATED, AS OFF-ROAD GUIDANCE IS ON |

VEHICLE OPERATION METHOD PRESENTATION DEVICE AND METHOD, AND VEHICLE CONTROL DEVICE

CROSS-REFERENCE TO RELATED APPLICATIONS

This application is a divisional application of and claims the benefit of priority under 35 U.S.C. §120 from U.S. application Ser. No. 12/738,301, filed Apr. 16, 2010, the entire contents of which is incorporated herein by reference. U.S. application Ser. No. 12/738,301 is a national stage of International Application No. PCT/IB08/02945, filed Nov. 4, 2008, which is based upon and claims the benefit of priority under 35 U.S.C. §119 from Japanese Patent Application No. 2007-300933, filed Nov. 20, 2007.

BACKGROUND OF THE INVENTION

1. Field of the Invention

The invention relates to a vehicle operation method presentation device and a vehicle control device. In particular, the invention relates to vehicle operation method presentation device and method that present to a driver of a vehicle an operation method for control switches provided for switching the control state of the vehicle, and to a vehicle control device that switches the control state of the vehicle upon operation of the control switches.

2. Description of the Related Art

For example, Japanese Patent Application Publication No. 11-344109 (JP-A-11-344109) discloses a device that selects a mode of travel at the time of travel of the vehicle, and restricts the operation of a predetermined control switch according to the selected mode of travel. In this device, for example, when a SNOW mode is selected as the mode of travel by operating a switch, the speed steps of the transmission that are selectable by using the shift lever are restricted to the steps other than "the first speed". In this case, the drive force that acts on the wheels on a snow road is restricted, so that it becomes possible to prevent the occurrence of a tire slip and secure appropriate travel of the vehicle.

The construction that allows the control state of the vehicle to be immediately switched to a desired state simply by operating a mode switch makes it unnecessary for a driver of the vehicle to perform a control-switching operation, and is therefore desirable in terms of the simple and easy switching of the control state of the vehicle. However, there are cases where the control state of the vehicle does not switch merely by operating the mode switch but it is necessary for the driver of the vehicle to further perform a control-switching operation after operating the mode switch in order to switch the vehicle to a desired control state. Such cases requires, for example, the operation of a transfer lever, a center differential lock switch, etc. That is, in such a system, it sometimes happens that unless the control-switching operation is performed by the driver of the vehicle in addition to the depression of the mode switch, the vehicle cannot be switched to a desired control state, and it becomes difficult to secure appropriate travel of the vehicle.

Besides, in some cases, a vehicle is equipped with, in addition to the mode switch for switching the mode of travel, individual function switches which are each provided, separately from the mode switch, for turning on and off a function that is included in a mode of travel. An example of the individual function switches is a 2nd-speed start switch for causing the available speed step range of the transmission of the vehicle to begin with "the 2nd speed" instead of "the 1st speed". In the case where the SNOW mode is selected as the mode of travel by the mode switch, the control state of the vehicle is switched so as to restrict the number of usable speed steps of the transmission of the vehicle. However, if the system is constructed so that after this switching is performed, the restriction of the number of speed steps of the transmission can be released by depressing the 2nd-speed start switch, it sometimes happens that the control state that matches a selected mode of travel cannot be realized.

SUMMARY OF THE INVENTION

The invention provides vehicle operation method presentation device and method that improve the realizability at which a control state of the vehicle that matches a selected mode is realized by operating a switch. Besides, the invention provides a vehicle control device that prevents the occurrence of control interference in conjunction with a control state of the vehicle for which both the automatic switching associated with the selection of a specific mode of travel and the manual switching associated with operation of a switch can be performed.

A first aspect of the invention provides a vehicle operation method presentation device that includes: travel mode selection means for selecting a mode of travel for a travel of a vehicle; control state switch means for realizing a vehicle control state recommended for the selected mode of travel upon operation of a control switch; and switch operation method presentation means for presenting to a driver an operation method for the control switch that is needed in order to realize the recommended control state by the control state switch means, when the travel mode selection means selects the mode of travel.

In this aspect, when a mode of travel is selected, an operation method for a control switch that is used in order to realize a control state that is recommended for the selected mode of travel is presented to the driver. If such an operation method is presented to the driver, it becomes easy for the driver to operate the control switch so that the control state recommended for the selected mode of travel is realized. Therefore, it becomes easier to realize the control state of the vehicle that matches the selected mode of travel by operating the control switch, and therefore the realizability of the recommended control state improves.

The foregoing vehicle operation method presentation device may further include determination means for determining whether the recommended control state and an actual control state are the same as each other. If the determination means determines that the recommended control state and the actual control state are not the same, the switch operation method presentation means may present to the driver the operation method for the control switch that is needed to realize the recommended control state by the control state switch means.

As a result, in the case where there is a deviation between the control state recommended for the selected mode of travel and the actual control state, an operation method for the control switch that is needed in order to realize the recommended control state is presented to the driver. This improves the realizability of the control state of the vehicle that matches the selected mode of travel in the case where the actual control state does not match the selected mode of travel.

Besides, when a guidance switch is operated to an on-state, the determination means may determine whether or not the recommended control state and the actual control state are the same.

As a result, when the guidance switch is operated to the on-state, it is determined whether or not there is a deviation between the control state recommended for the selected mode of travel and the actual control state. Then, if it is determined that there is a deviation therebetween, an operation method for a control switch which is needed in order to realize the recommended control state is presented to the driver. Therefore, this construction improves the realizability of the control state of the vehicle that matches the selected mode of travel in the case where the actual control state does not match the selected mode of travel when a predetermined guidance switch is operated to the on-state.

Besides, the vehicle operation method presentation device may further include vehicle operation method presentation means for presenting to the driver an operation method for the vehicle that facilitates realization of the recommended control state by the control state switch means upon the operation of the control switch if the recommended control state is not realized by the control state switch means at elapse of a first predetermined time after the operation method for the control switch is presented to the driver by the switch operation method presentation means.

As a result, if the control state recommended for a selected mode of travel is not realized even when the first predetermined time elapses after an operation method for a control switch which is needed in order to realize the recommended control state is presented, an operation method for the vehicle that facilitates the realization of the control state is presented to the driver. If such an operation method is presented to the driver, it becomes easier for the driver to perform an operation of the vehicle that should be performed in order to facilitate the realization of the recommended control state upon the operation of the control switch. Therefore, it becomes easier to form a vehicle situation that is effective in realizing the recommended control state by operating the control switch. Therefore, the realizability of the recommended control state will further improve.

Besides, in the vehicle operation method presentation, if the recommended control state is not realized by the control state switch means at elapse of a second predetermined time after the operation method for the control switch is presented to the driver by the switch operation method presentation means, the selected mode of travel may be returned to a usual mode of travel by the travel mode selection means.

As a result, if the control state recommended for a selected mode of travel is not realized even when the second predetermined time elapses after an operation method for a control switch for realizing the recommended control state is presented to the driver, the mode of travel is automatically switched back to the usual mode of travel. Therefore, the invention prevents a long-time continuation of a state in which the control state of the vehicle does not switch to a state for which an operation method for a control switch is presented or to the recommended control state as the control switch is not appropriately operated after the mode of travel is selected.

In the foregoing vehicle operation method presentation device, if a vehicle speed is greater than a predetermined vehicle speed, the selected mode of travel may be returned to a usual mode of travel by the travel mode selection means.

As a result, if the vehicle speed of the vehicle exceeds a predetermined vehicle speed, the mode of travel is automatically switched back to the usual mode of travel. Therefore, this construction prevents the occurrence of an event in which after the vehicle speed rises, the control state of the vehicle switches to the control state recommended up to that time point.

The control switch may be a transfer switch or a differential lock switch for switching a drive method for a wheel.

A second aspect of the invention provides a vehicle control device that includes: manual control state switch means for switching a control state of a vehicle upon operation of at least one control switch; travel mode selection means for selecting a mode of travel for a travel of the vehicle; automatic control state switch means for automatically switching the control state of the vehicle when the travel mode selection means selects a first mode of travel other than a usual mode of travel; and manual switching restriction means for restricting the manual control state switch means from switching the control state of the vehicle upon operation of a first control switch that is one of the at least one control switch, if the first mode of travel has been selected by the travel mode selection means.

In the second aspect, the control state of the vehicle is switched upon operation of a control switch, and is automatically switched to a predetermined control state if a first mode of travel other than the usual mode of travel is selected. However, in the case where the first mode of travel is selected, the further switching of the control state upon operation of a control switch is restricted. Therefore, it is possible to make arrangement between the automatic switching of the control state of the vehicle associated with the selection of a specific mode of travel and the manual switching thereof associated with operation of a switch, and therefore the occurrence of control interference between the automatic switching and the manual switching can be prevented.

In the foregoing vehicle control device, even when the first mode of travel has been selected by the travel mode selection means, the manual control state switch means may be allowed to switch the control state of the vehicle upon operation of a switchable switch that is one of the at least one control switch other than the first control switch.

As a result, when a mode of travel other than the usual mode of travel is selected, the switching of the control state of the vehicle upon operation of a control switch other than the switchable switch is restricted, but the switching of the control state of the vehicle upon operation of the switchable switch is allowed.

The vehicle control device may further include restriction switch notification means for informing the driver of the first control switch when switching of the control state by the manual control state switch means is restricted by the manual switching restriction means.

As a result, when a specific mode of travel is selected, the driver is informed of a control switch whose function of switching the control state of the vehicle is restricted. Therefore, according to the invention, it is possible to inform the driver of a control switch that does not perform its function during a specific mode of travel.

The restriction switch notification means may inform the driver of the first control switch when the first control switch is operated.

This construction prevents the occurrence of an event in which the action of informing the driver of the control switch that does not perform its function during a specific mode of travel is excessively performed.

A third aspect of the invention provides a vehicle operation method presentation method that includes: selecting a mode of travel for a travel of a vehicle; realizing a vehicle control state recommended for the selected mode of travel upon operation of a control switch; and presenting to a driver an operation method for the control switch that is needed in order to realize the recommended control state, when the mode of travel is selected.

This method facilitates the realization of the control state of the vehicle that matches the selected mode of travel upon operation of the control switch, and improves the realizability of that control state. Besides, this method prevents the occurrence of control interference between the automatic switching of the control state of the vehicle associated with the selection of a specific mode of travel and the manual switching thereof associated with operation of a switch.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5 is a diagram representing relations among the recommended drive fashions (or positions) of the vehicle, input data states, and contents to be displayed for various modes of travel;

FIG. 6 is a diagram representing relations between the input data states and the display contents in the case where the drive system of the vehicle is not in the recommended drive fashion;

FIG. 8 is a flowchart of an example of a control routine that is executed in the off-road guidance system of the embodiment; and FIG. 9 is a diagram representing relations between the conditions for invalidating the input operation of each of individual function switches during the execution of a control of the off-road guidance and the contents to be displayed at the time of the invalidation.

DETAILED DESCRIPTION OF EMBODIMENTS

Concrete embodiments of the invention will be described hereinafter with reference to the drawings.

Figure 1:
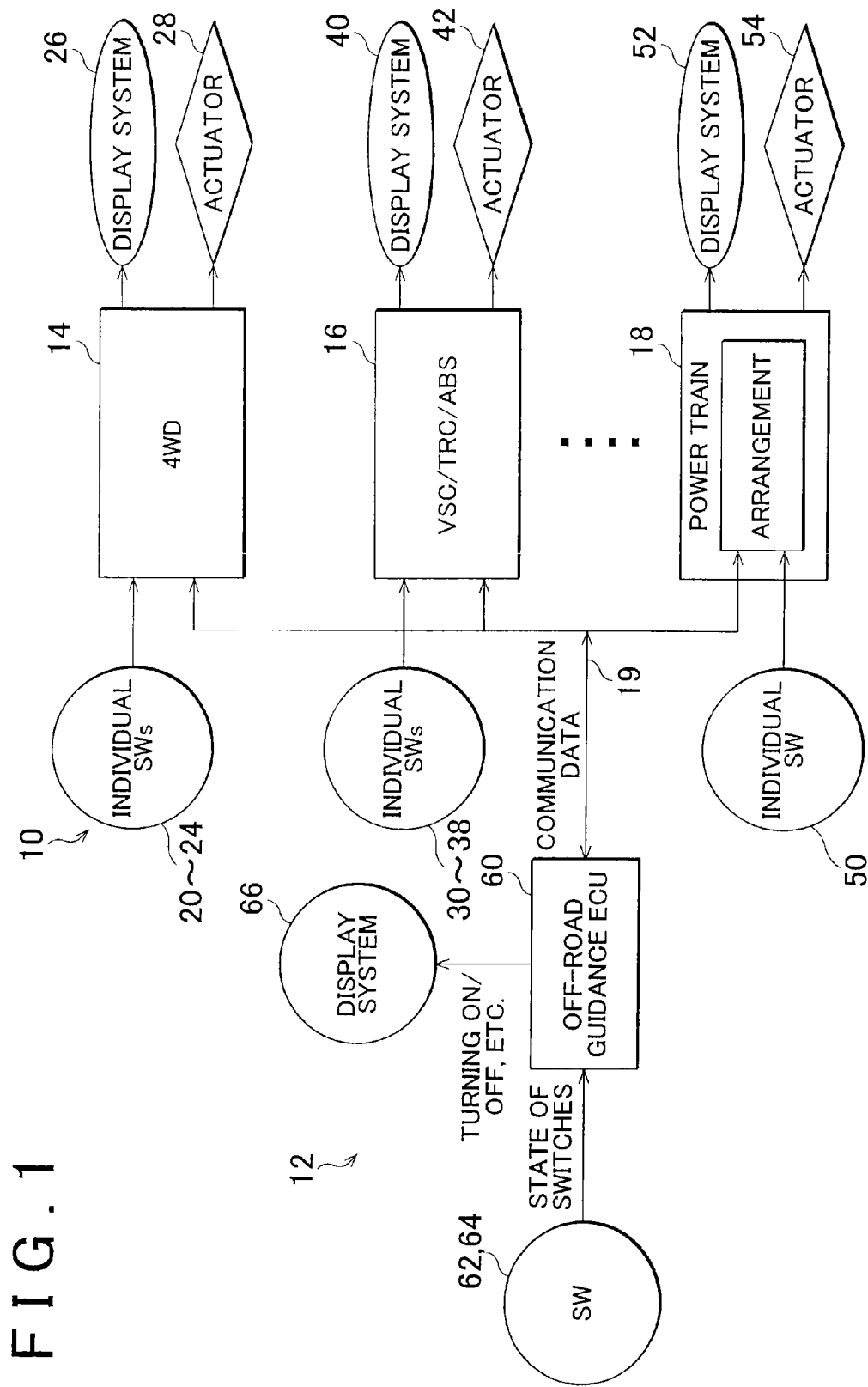
FIG. 1 is a construction diagram of a vehicle-mounted system that is an embodiment of the invention.
Figure 2:
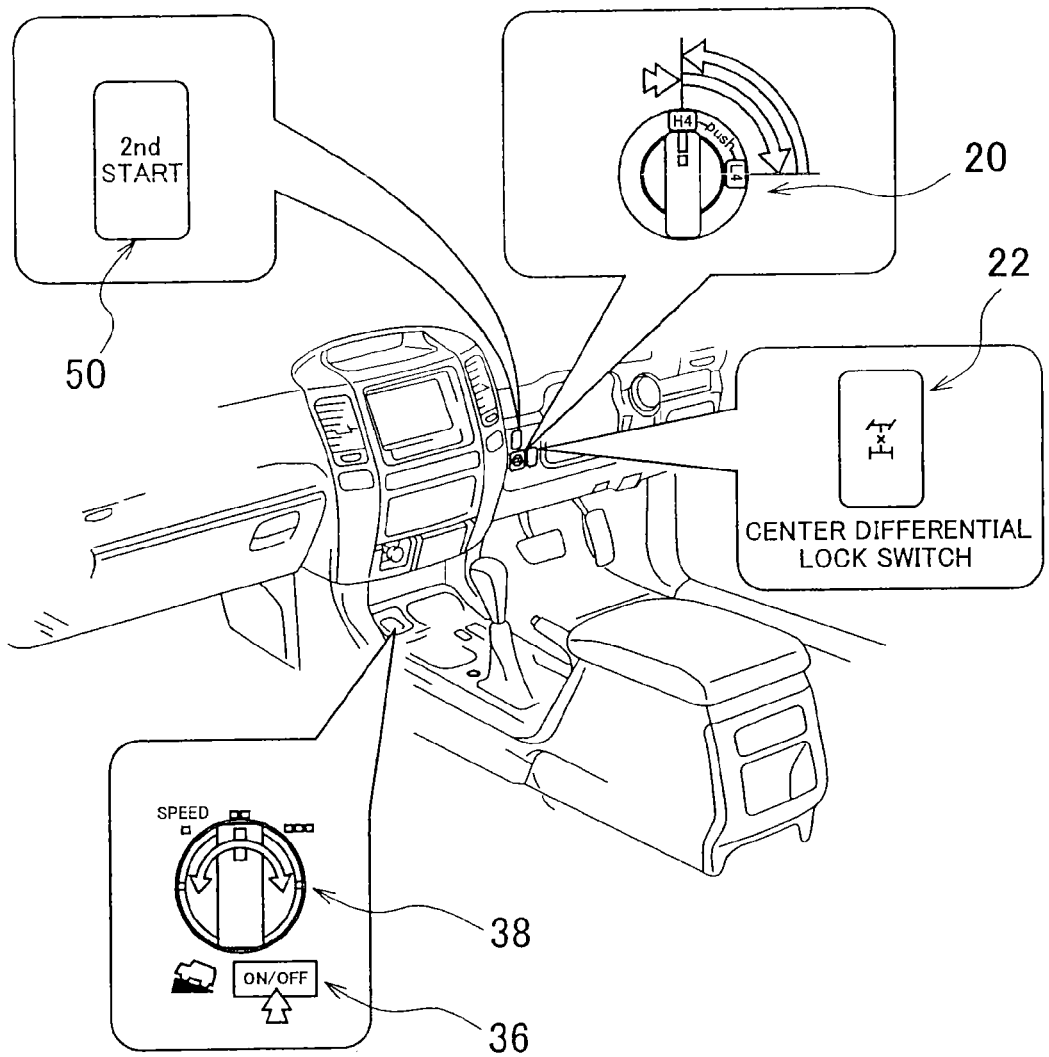
FIG. 2 is a diagram representing the installation locations of various switches that are installed in a vehicle that is equipped with the vehicle-mounted system of an embodiment.

FIG. 1 is a construction diagram of a vehicle-mounted system that is an embodiment of the invention. FIG. 2 shows a diagram representing the locations of installation of various switches that are installed in a vehicle that is equipped with the vehicle-mounted system of the embodiment. The vehicle-mounted system of the embodiment includes a drive system 10 that appropriately switches the state of engagement of a drive system of a vehicle according to a travel state of the vehicle, such as an off-road travel or the like, and an off-road guidance system 12 that provides an operation assist for a driver who is not used to the off-road travel. Incidentally, in this embodiment, the vehicle is of a full-time 4-wheel drive.

As shown in FIG. 1, the drive system 10 has a 4WD-ECU 14 that switches the drive method of the drive system of the vehicle, a VSC-ECU 16 that performs a behavior control of the vehicle, and a power train ECU 18 that performs a second- speed start control. The ECUs 14 to 18 are each constructed mainly of a microcomputer, and are interconnected via a communication bus 19.

The 4WD-ECU 14 is electrically connected to a transfer switch 20, a center differential lock switch 22, a rear differential lock switch 24, a display system 26, and actuators 28. The transfer switch 20 is a dial-type switch for selecting as the drive method of the drive system one of a high range (H4) that is suitable for an ordinary travel of the vehicle, and a low range (L4) suitable for a travel that requires larger drive force than the ordinary travel. The transfer switch 20 supplies a signal that indicates the H4 state or the L4 state to the 4WD-ECU 14. Incidentally, the transfer switch 20 is not limited to the dial-type switch, but may also be of a shift lever type. Besides, the center differential lock switch 22 is an on/off switch for selecting either a locked state (H4L or L4L) or an unlocked state of a center differential. The center differential lock switch 22 supplies a signal that indicates an on/off state to the 4WD-ECU 14. The rear differential lock switch 24 is an on/off switch for selecting either the locked state or the unlocked state of a rear differential lock, and supplies a signal that indicates the on/off state to the 4WD-ECU 14.

The display system 26 includes an L4 actuation indicator lamp, a center differential lock (DL) actuation indicator lamp, and a rear differential lock (RDL) actuation indicator lamp, and is provided within a combination meter disposed forward from a driver's seat. The L4 actuation indicator lamp, the center differential lock actuation indicator lamp, and the rear differential lock actuation indicator lamp of the display system 26 are individually turned on or blinked by a command from the 4WD-ECU 14. Besides, the actuators 28 includes a transfer actuator that switches the drive method of the drive system between the H4 and the L4, a center differential lock actuator that switches the center differential lock between the locked state and the unlocked state, a rear differential lock actuator that switches the rear differential lock between the locked state and the unlocked state, and are individually actuated by a command from the 4WD-ECU 14.

The VSC-ECU 16 is electrically connected to a VSC stop switch 30, an A-TRC stop switch 32, an AVS switch 34, a crawl main switch 36, a crawl dial switch 38, a display system 40, and actuators 42. The VSC stop switch 30 is an on/off switch for selecting a stop of engagement of a control (VSC control) of securing stability of the cornering behavior of the vehicle, and supplies a signal that indicates the on/off state to the VSC-ECU 16. The A-TRC stop switch 32 is an on/off switch for selecting a stop of engagement of a control (A-TRC control) of securing behavior stability at the time of acceleration associated with accelerator operation, and supplies a signal that indicates the on/off state to the VSC-ECU 16. Besides, the AVS switch 34 is an on/off switch for selecting one of a normal mode suitable for ordinary travel and a sport mode suitable for sport travel as the mode of the damping force control of a shock absorber, and supplies a signal that indicates the on/off state to the VSC-ECU 16.

The crawl main switch 36 is an on/off switch for selecting a control (crawl control) of causing the vehicle to travel at a constant low vehicle speed (e.g., 1 km/h to 5 km/h) while restraining the wheel spin or lock to a minimum without involving the accelerator operation nor the brake operation performed by the driver, and supplies a signal that indicates the on/off state to the VSC-ECU 16. Besides, the crawl dial switch 38 is a dial-type switch for switching the vehicle speed during the crawl control among a plurality of levels (e.g., three levels: a low mode of 1 km/h, a medium mode of 3 km/h, and a high mode of 5 km/h), and supplies a signal that indicates the state of the switch to the VSC-ECU 16.

The display system 40 includes a VSC-OFF indicator lamp, a slip indicator lamp, an AVS sport indicator lamp, and a crawl control actuation indicator lamp, and is provided within the combination meter disposed forward from the driver's seat. The indicator lamps of the display system 40 are individually turned on or blinked by a command from the VSC-ECU 16. The actuators 42 include an engine actuator that changes the amount of fuel injection or the intake air amount, a brake actuator that changes the amount of braking, and an absorber actuator that changes the hardness of a shock absorber, and are individually actuated by a command from the VSC-ECU 16.

The power train ECU 18 is electrically connected to a second-speed start switch 50, a display system 52, and actuators 54. The second-speed start switch 50 is an on/off switch for selecting the second-speed standing start of the vehicle, and supplies a signal that indicates the on/off state to the power train ECU 18. The display system 52 includes a second-speed start engagement indicator lamp, and is provided within the combination meter disposed forward from the driver's seat. The indicator lamps of the display system 52 are turned on by a command from the power train ECU 18. The actuators 54 include the transmission of the vehicle, and are individually actuated by a command from the power train ECU 18.

Herein, the operation of the foregoing drive system 10 will be described below.

The 4WD-ECU 14 determines whether the transfer switch 20 is at the H4 or the L4, when the engine start/stop switch is in the ignition-on mode and the transmission's select lever is at a neutral position and the vehicle is at a stop. Then, according to the result of the determination, that is, the determined position (the H4 or the L4) of the transfer switch 20, the 4WD-ECU 14 actuates the transfer actuator so that the drive method of the vehicle becomes the H4 or the L4.

In the case where the driver switches the transfer switch 20 from the H4 to the L4, the 4WD-ECU 14 determines that the transfer switch 20 has been switched from the H4 to the L4, and actuates the transfer actuator so that the drive method of the vehicle switches from the H4 to the L4. In this case, the actuation of the transfer actuator switches the drive method of the vehicle from the H4 to the L4. Likewise, when the driver switches the transfer switch 20 from the L4 to the H4, the 4WD-ECU 14 determines that the transfer switch 20 has switched from the L4 to the H4, and actuates the transfer actuator so that the drive method of the vehicle switches from the L4 to the H4. In this case, the actuation of the transfer actuator switches the drive method of the vehicle from the L4 to the H4.

Besides, upon determining that the transfer actuator is performing a switching action between the H4 and the L4, the 4WD-ECU 14 blinks the L4 actuation indicator lamp of the display system 26. Upon determining that the switching of the drive method from the H4 to the L4 by the transfer actuator has been completed, the 4WD-ECU 14 turns on the L4 actuation indicator lamp. Besides, upon determining that the switching of the drive method from the L4 to the H4 by the transfer actuator has been completed, the 4WD-ECU 14 turns off the L4 actuation indicator lamp. Therefore, during the action of switching between the H4 and the L4, the L4 actuation indicator lamp is blinked. Then, after the switching to the L4 is completed, the L4 actuation indicator lamp is turned on. Or, after the switching to the H4 is completed, the L4 actuation indicator lamp is turned off.

Furthermore, when the engine start/stop switch is in the ignition-on mode and the vehicle speed is less than or equal to a predetermined value (e.g., 100 km/h), the 4WD-ECU 14 determines whether the center differential lock switch 22 is in the off-state or the on-state, and also determines whether the rear differential lock switch 24 is in the off-state or the on-state. If as a result it is determined that the center differential lock switch 22 is in the off-state or that it is in the on-state, the 4WD-ECU 14 actuates the center differential lock actuator so that the center differential enters the unlocked state or the locked state. Besides, if it is determined that the rear differential lock switch 24 is in the off-state or that it is in the on-state, the 4WD-ECU 14 actuates the rear differential lock actuator so that the rear differential enters the unlocked state or the locked state.

In the case where the driver turns on the center differential lock switch 22 when the center differential is in the unlocked state, the 4WD-ECU 14 determines that the center differential lock switch 22 has switched from the off-state to the on-state, and actuates the center differential lock actuator so that the center differential switches from the unlocked state to the locked state. In this case, the actuation of the center differential lock actuator locks the center differential, so that the front wheels and the rear wheels are directly coupled for integral rotation.

On the other hand, in the case where the driver turns off the center differential lock switch 22 when the center differential is in the locked state, the 4WD-ECU 14 determines that the center differential lock switch 22 has switched from the on-state to the off-state, and actuates the center differential lock actuator so that the center differential switches from the locked state to the unlocked state. In this case, the actuation of the center differential lock actuator unlocks the center differential, so that the direct coupling of the front wheels and the rear wheel is released.

Besides, in the case where the driver turns on the rear differential lock switch 24 when the rear differential is in the unlocked state, the 4WD-ECU 14 determines that the rear differential lock switch 24 has switched from the off-state to the on-state, and actuates the rear differential lock actuator so that the rear differential switches from the unlocked state to the locked state. In this case, the actuation of the rear differential lock actuator locks the rear differential, so that the left and right rear wheels are directly coupled for integral rotation.

On the other hand, in the case where the driver turns off the rear differential lock switch 24 when the rear differential is in the locked state, the 4WD-ECU 14 determines that the rear differential lock switch 24 has switched from the on-state to the off-state, and actuates the rear differential lock actuator so that the rear differential switches from the locked state to the unlocked state. In this case, the actuation of the rear differential lock actuator unlocks the rear differential, so that the direct coupling of the left and right rear wheels is released.

Besides, upon determining that the center differential lock actuator or the rear differential lock actuator is performing the action of switching between the unlocked state and the locked state, the 4WD-ECU 14 blinks the center differential lock actuation indicator lamp or the rear differential lock actuation indicator lamp of the display system 26. Upon determining that the switching of the center differential to the locked state by the center differential lock actuator or the switching of the rear differential to the locked state by the rear differential lock actuator has been completed, the 4WD-ECU 14 turns on the center differential lock actuation indicator lamp or the rear differential lock actuation indicator lamp. Besides, upon determining that the switching of the center differential to the unlocked state by the center differential lock actuator or the rear differential to the unlocked state by the rear differential lock actuator has been completed, the 4WD-ECU 14 turns off the center differential lock actuation indicator lamp or the rear differential lock actuation indicator lamp.

Hence, during the action of switching between the unlocked state and the locked state of the center differential or the rear differential, the center differential lock actuation indicator lamp or the rear differential lock actuation indicator lamp is blinked. However, after the switching of the center differential or the rear differential to the locked state is completed, the center differential lock actuation indicator lamp or the rear differential lock actuation indicator lamp is turned on. Or, after the switching of the center differential or the rear differential to the unlocked state is completed, the center differential lock actuation indicator lamp or the rear differential lock actuation indicator lamp is turned off.

The VSC-ECU 16 determines whether the VSC stop switch 30 is turned on and whether the A-TRC stop switch 32 is turned on, and also determines whether the AVS switch 34 is in a state corresponding to the normal mode or a state corresponding to the sport mode, when the engine start/stop switch is in the ignition-on mode.

In the case where the driver depresses the VSC stop switch 30 when the VSC control can be engaged, the VSC-ECU 16 determines that the VSC stop switch 30 has switched from the off-state to the on-state, and restricts the actuation of the engine actuator and the brake actuator so that the VSC control is not executed but is stopped, and turns on the VSC-OFF indicator lamp of the display system 40. After this, therefore, the engagement of the VSC control using the engine actuator and the brake actuator is stopped, and the VSC-OFF indicator lamp is turned on.

On the other hand, in the case where the driver depresses the VSC stop switch 30 when the VSC control has been stopped from being engaged, the VSC-ECU 16 determines that the VSC stop switch 30 has switched from the on-state to the off-state, and release the restriction of the actuation of the engine actuator and the brake actuator so that the VSC control will be engaged again, and also turns off the VSC-OFF indicator lamp. After this, therefore, the engagement of the VSC control using the engine actuator and the brake actuator is permitted, and the VSC-OFF indicator lamp is turned off.

In the case where the driver depresses the A-TRC stop switch 32 when the A-TRC control is engageable, the VSC-ECU 16 determines that the A-TRC stop switch 32 has switched from the off-state to the on-state, and that restricts the actuation of the engine actuator and the brake actuator so that the A-TRC control is not executed but is stopped, and turns on the slip indicator lamp. After this, therefore, the engagement of the A-TRC control using the engine actuator and the brake actuator is stopped, and the slip indicator lamp is turned on.

On the other hand, in the case where the driver depresses the A-TRC stop switch 32 when the A-TRC control is stopped from being engaged, the VSC-ECU 16 determines that the A-TRC stop switch 32 has switched from the on-state to the off-state, and releases the restriction of the actuation of the engine actuator and the brake actuator so that the A-TRC control can be engaged again, and turns off the slip indicator lamp. After this, therefore, the engagement of the A-TRC control using the engine actuator and the brake actuator is permitted, and the slip indicator lamp is turned off.

Besides, in the case where the driver depresses the AVS switch 34 when the damping force control of the shock absorber is in the normal mode, the VSC-ECU 16 determines that the switching of the AVS switch 34 has been performed, and actuates the absorber actuator so that the damping force control switches from the normal mode to the sport mode, and turns on the AVS sport indicator lamp. In this case, the actuation of the absorber actuator switches the damping force control of the shock absorber to the sport mode, and causes the AVS sport indicator lamp to turn on.

On the other hand, in the case where the driver depresses the AVS switch 34 when the damping force control of the shock absorber is in the sport mode, the VSC-ECU 16 determines that the switching operation of the AVS switch 34 has been performed, and actuates the absorber actuator so that the damping force control switches from the sport mode to the normal mode, and also turns off the AVS sport indicator lamp. In this case, the actuation of the absorber actuator switches the damping force control of the shock absorber to the normal mode, and also causes the AVS sport indicator lamp to turn off.

Besides, the VSC-ECU 16 determines whether the crawl main switch 36 is turned on, and also determines which of the mode positions corresponding to the low mode (suitable for traveling on rocks, stones, etc), the medium mode (suitable for traveling down a slope of rubble and the like or traveling over snow bumps and the like), and the high mode (suitable for traveling up a slope of rubble and the like or traveling on snow, mud, mire, gravel, grass, etc.) is the present position of the crawl dial switch 38, when the engine is running, the select lever of the transmission is at a position other than the parking position and the neutral position, the transfer switch 20 is at the L4, the second-speed start switch 50 is not in the second-speed standing start mode, and the parking brake has been released.

Then, in the case where the driver turns on the crawl main switch 36, the VSC-ECU 16 determines that the crawl main switch 36 has switched from the off-state to the on-state. After that, the VSC-ECU 16 actuates the engine actuator and the brake actuator so that the crawl control will be executed, and also turns on the crawl control actuation indicator lamp, and blinks the slip indicator lamp. In this case, the crawl control using the engine actuator and the brake actuator is engaged, and the crawl control actuation indicator lamp is turned on and the slip indicator lamp is blinked. Incidentally, the VSC-ECU 16 engages the crawl control at a constant vehicle speed commensurate with the mode position of the crawl dial switch 38.

On the other hand, in the case where during the engagement of the crawl control, the driver turns off the crawl main switch 36, the VSC-ECU 16 determines that the crawl main switch 36 has switched from the on-state to the off-state. After that, the VSC-ECU 16 restricts the actuation of the engine actuator and of the brake actuator so that the crawl control is stopped, and also turns off the crawl control actuation indicator lamp, and the turns off the slip indicator lamp. In addition, the VSC-ECU 16 restricts the actuation of the engine actuator and the brake actuator so that the crawl control is stopped, and turns off the crawl control actuation indicator lamp and turns off the slip indicator lamp, also when during the engagement of the crawl control the transmission's select lever is switched to the parking position or the transfer switch 20 is switched to the H4. In this case, the engagement of the crawl control using the engine actuator and the brake actuator is stopped, and the crawl control actuation indicator lamp is turned off, and the slip indicator lamp is turned off.

The power train ECU 18 determines whether the second-speed start switch 50 is in the off-state or the on-state, when the engine start/stop switch is in the ignition-on mode state. If, as a result, it is determined that the second-speed start switch 50 is in the off-state, the power train ECU 18 actuates the actuators 54 so that the standing start of the vehicle is performed as usual, that is, with the first speed as an initial speed step.

Then, in the case where the driver turns on the second-speed start switch 50, the power train ECU 18 determines that the second-speed start switch 50 has switched from the off-state to the on-state, and actuates the actuators 54 so that the standing start of the vehicle is initiated with the second speed, and turns on the second-speed start engagement indicator lamp of the display system 52. In this case, the second-speed standing start (second-speed start control) using the actuators 54 is executed, and the second-speed start engagement indicator lamp is turned on.

On the other hand, in the case where during the second-speed start mode, the driver turns off the second-speed start switch 50, the power train ECU 18 determines that the second-speed start switch 50 has switched from the on-state to the off-state, and releases the engagement of the second-speed start mode, so that the standing start of the vehicle will be initiated with the first speed, and also turns off the second-speed start engagement indicator lamp of the display system 52. In addition, the power train ECU 18 releases the second-speed start mode and turns off the second-speed start engagement indicator lamp, also when the engine start/stop switch is switched to the accessory mode state or the lock mode state. In this case, the first-speed standing start using the actuators 54 as a usual start is executed, and the second-speed start engagement indicator lamp is turned off.

Figure 3:
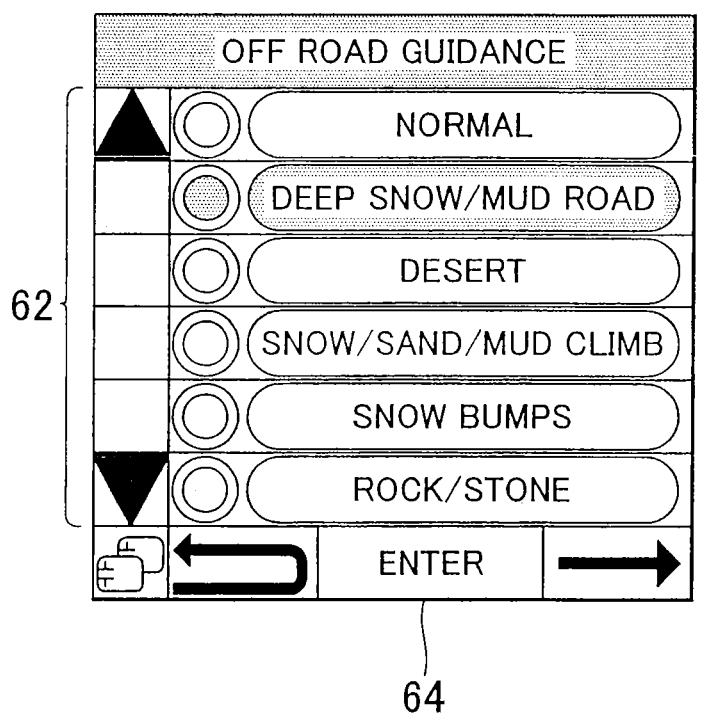
FIG. 3 is a diagram representing modes of travel that can be selected in an off-road guidance system of the embodiment.

FIG. 3 shows a diagram representing the modes of travel that can be selected in the off-road guidance system 12 of this embodiment. Incidentally, FIG. 3 shows a touch display displaying the select switches that allow the driver to select a desired mode of travel.

As shown in FIG. 1, the off-road guidance system 12 has an off-road guidance ECU 60 that is constructed mainly of a microcomputer. The off-road guidance ECU 60 is connected for communication with the foregoing ECUs 14 to 18 via the communication bus 19, so that the ECUs can give and receive communication data to and from each other.

The off-road guidance ECU 60 is electrically connected to mode select switches 62 and an off-road guidance start switch 64. The mode select switches 62 and the off-road guidance start switch 64, as shown in FIG. 3, are displayed on a multi-purpose display that is disposed, for example, in a center panel, and that is visually recognizable and operable by the driver, in such a manner that the displayed switches can be operated by touching them. Incidentally, the switches 62, 64 are not limited to those that are displayed on a display so as to be operable by touching, but may also be disposed as hardware devices in the center panel or the center console or the like.

The mode select switches 62 are switches for selecting only one of a plurality of modes of travel at the time of a travel of the vehicle, for example, switches that allow the selection of a mode from six modes of travel that include a normal mode suitable for usual traveling, a deep snow/mud road mode suitable for traveling on a deep snow or mud road, a desert mode suitable for traveling in a desert, a snow/sand/mud climbing mode suitable for traveling on uphill roads of snow, mud or sand, a snow bump mode suitable for traveling over snow bumps, and a rock/stone mode suitable for traveling on rocks and stones. Besides, the off-road guidance start switch 64 is a switch that is pressed by the driver in order to start the off-road guidance, and, for example, is an "ENTER" button shown in FIG. 3. Signals of the switches 62, 64 are supplied to the off-road guidance ECU 60. Incidentally, FIG. 3 shows a state in which the deep snow/mud road mode has been selected as the mode of travel.

The off-road guidance ECU 60 is also electrically connected to a display system 66. The display system 66 is the foregoing multi-purpose display, and appropriately presents displays for the off-road guidance as described above. The display screens of the multi-purpose display may be of any type as long as the screens are provided in a hierarchical manner. For example, the switches 62, 64 may be displayed at a higher-level layer, and the screens of the display system 66 may be displayed at lower-level layers.

Figure 4:
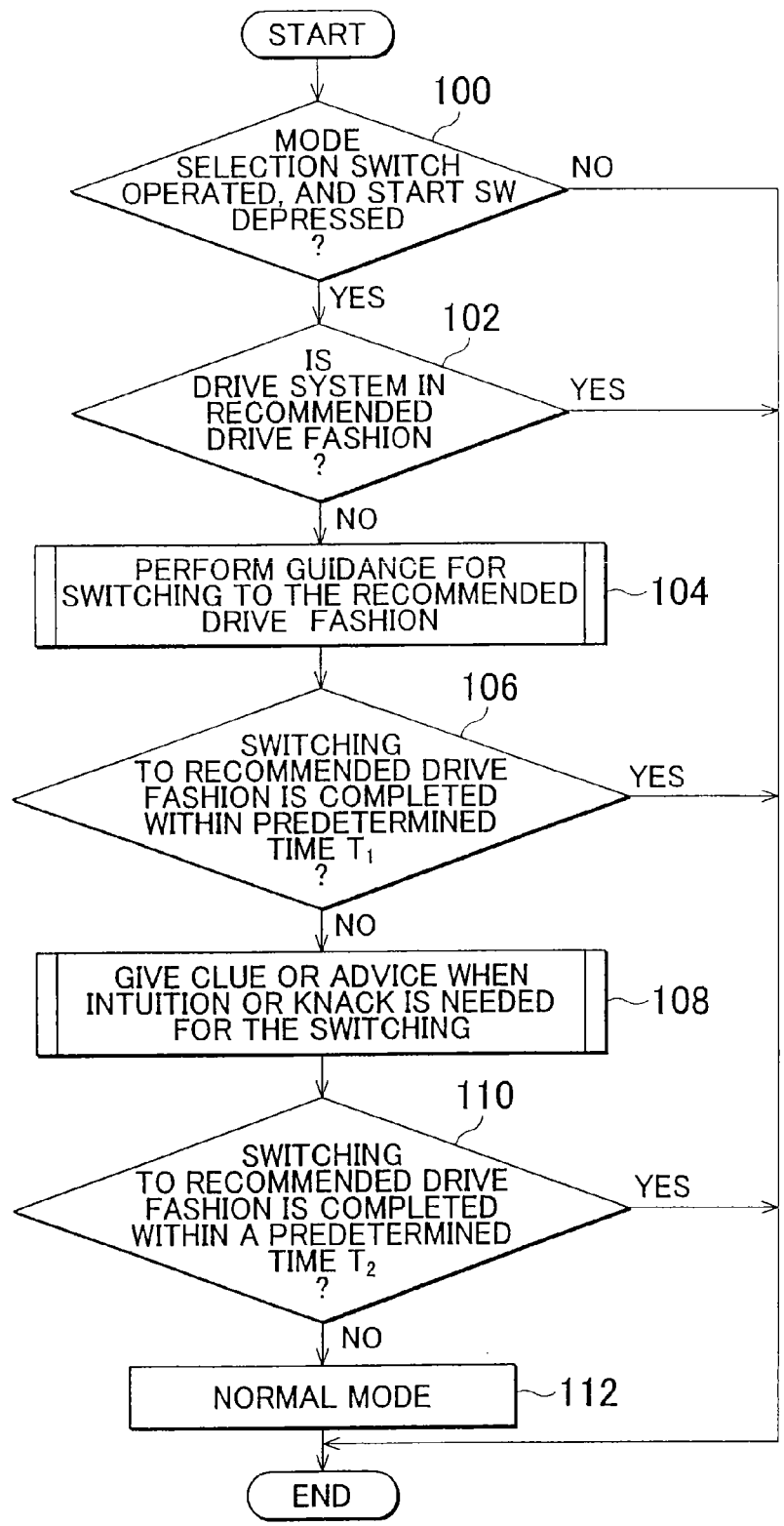
FIG. 4 is a flowchart showing an example of a control routine that is executed in the off-road guidance system of the embodiment.
Figure 7:
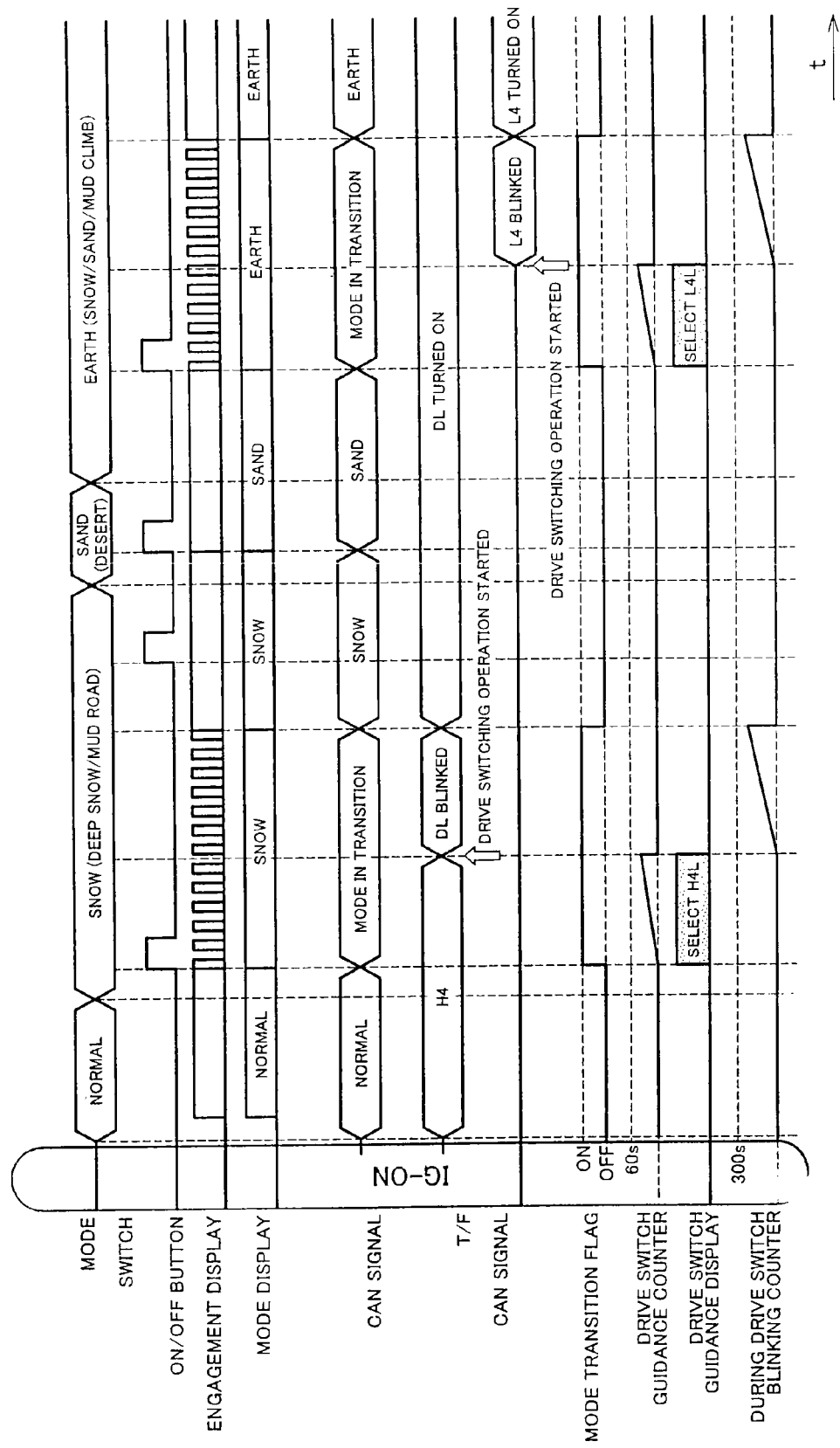
FIG. 7 is a time chart of an example of the switching of the mode of travel.

Hereinafter, basic operation of the off-road guidance system 12 will be described with reference to FIGS. 4 to 7. FIG. 4 is a flowchart showing an example of a control routine that is executed by the off-road guidance ECU 60 in the off-road guidance system 12 of this embodiment so as to realize basic operations. FIG. 5 is a diagram representing relations among the recommended drive fashions (or positions) of the vehicle, input data states, and display contents for the various modes of travel. FIG. 6 is a diagram representing relations between the input data states and the display contents in the case where the drive system of the vehicle is not in the recommended drive fashion. FIG. 7 is a time chart of an example of the switching of modes of travel.

In this embodiment, the off-road guidance ECU 60 is activated when the engine start/stop switch is switched from the off-mode to the ignition-on mode. After being activated, the off-road guidance ECU 60 displays the mode select switches 62 and the off-road guidance start switch 64 on the multi-purpose display so that the switches can be operated by touching. During an early period following the activation, the mode select switches 62 are in a state in which the normal mode has been selected, and the selected normal mode is displayed in a white-black inverted state.

On the precondition that the vehicle speed is less than or equal to a predetermined value (e.g., 8 km/h), the off-road guidance ECU 60 determines whether the selected mode of travel has been switched by operating the mode select switches 62 and the switching has been followed by the pressing of the off-road guidance start switch 64 (step 100). If this results in a negative determination, the present execution of the routine ends without any further process. However, if an affirmative determination is made, it is considered that the vehicle is in a state in which the control of the off-road guidance needs to be executed, and it is subsequently determined whether or not the drive system of the vehicle is in a recommended drive fashion (step 102).

The off-road guidance ECU 60 has a storage device in which relations among the recommended drive fashions of the drive system of the vehicle, the input data states and the display contents for each mode of travel as shown in FIG. 5 are stored beforehand. For example, when the present mode of travel is the desert mode, it is recommended that the drive method of the drive system be the H4 mode and the center differential be in the locked state (H4L). When the mode of travel is the snow/sand/mud climbing mode, it is recommended that the drive method of the drive system be the L4 mode and the center differential be in the locked state (L4L).

The off-road guidance ECU 60 determines whether the recommended drive fashion of the drive system and the actual drive fashion are the same, that is, whether the drive system of the vehicle is in the recommended drive fashion (step 102), on the basis of the aforementioned relation stored in the storage device for the presently selected mode of travel, and the signals that are supplied from the 4WD-ECU 14 via the communication bus 19 and that indicate the states of the input switches 20 to 24 and the states of the actuators 28.

For example, in a situation where the presently selected mode of travel is the snow bump mode, it is determined whether the transfer (or the transfer device) is not in the L4 mode (the L4 state signal is OFF), the center differential is in the unlocked state (the center differential lock state signal is OFF), or the rear differential lock is in the locked state (the rear differential lock state signal is ON). Besides, in a situation where the selected mode of travel is the rock/stone mode, it is determined whether the transfer is not in the L4 mode (the L4 state signal is OFF), the center differential is in the unlocked state (the center differential lock state signal is OFF), or the rear differential lock is in the unlocked state (the rear differential lock state signal is OFF).

In the case where it is determined that the drive system of the vehicle is not in the recommended drive fashion, the off-road guidance ECU 60 switches the screen of the multi-purpose display of the display system 66 to a lower level layer, and displays on the multi-purpose display the information about the recommended drive fashion of the drive system of the vehicle, that is, an operation method for the input switches 20 to 24 for realizing the recommended drive fashion, thereby presenting the information and the operation method to the driver (step 104). For example, in the case where the drive system of the vehicle is not in the recommended drive fashion due to the center differential being in the unlocked state when the deep snow/mud road mode has been selected as the mode of travel, the off-road guidance ECU 60 causes the display system 66 to display characters that read "Please select H4L" as a guidance display, so that the drive method of the drive system that is the recommended drive fashion becomes the H4 mode, and the center differential enters the locked state, that is, so that the transfer switch 20 is selectively operated to the H4 mode state and the center differential lock switch 22 is selectively operated to the locked state.

In the case where it is determined that the drive system of the vehicle is not in the recommended drive fashion, it is considered that the switching of the mode of travel has not been completed, and therefore the off-road guidance ECU 60 causes the display system 66 to display the selected mode of travel by blinking it, and sends out the mode transition signal indicating that the mode of travel is in the transitional state, to the communication bus 19.

The off-road guidance ECU 60, after starting the guidance display of the information about the recommended drive fashion of the drive system (the operation method for the switches 20 to 24), activates a drive switch guidance counter, and continues the guidance display for a predetermined time (e.g., 60 seconds) T1. Then, the off-road guidance ECU 60 determines whether or not the switching operation to the recommended drive fashion of the drive system has been started, on the basis of whether or not, within the predetermined time T1, a change occurs in any of the states of the input switches 20 to 24 supplied from the 4WD-ECU 14 via the communication bus 19.

The 4WD-ECU 14 blinks the L4 actuation indicator lamp, the center differential lock actuation indicator lamp, or the rear differential lock actuation indicator lamp of the display system 26 while the corresponding one or more of the actuators 28 are performing the switching operation. Then, upon determining that the aforementioned switching operation has been started, the off-road guidance ECU 60 stops the counting of a drive switch guidance counter, and stops the guidance display on the multi-purpose display, and determines whether or not the switching to the recommended drive fashion of the drive system has been completed on the basis of whether or not there is a change in the signals that are supplied from the 4WD-ECU 14 via the communication bus 19 and that show the states of the actuators 28 within a predetermined time T1 (step 106).

A storage device of the off-road guidance ECU 60 stores beforehand relations between the input data states and the display contents in the case where the drive system of the vehicle as shown in FIG. 6 is not in the recommended drive fashion. For example, the locked state of the center differential is more easily realized if the vehicle is accelerated or decelerated, or is reversed, and the L4 mode of the transfer is more easily realized if the vehicle is stopped and the transmission's select lever is operated to the neutral position, and the locked state of the rear differential is more easily realized if the vehicle is slightly moved straight forward and then stopped.

Upon determining in step 106 that the switching of the drive system to the recommended drive fashion was not completed within the predetermined time T1, the off-road guidance ECU 60 displays on the multi-purpose display a technique or a clue (an operation method for the vehicle) in terms of operation which facilitates the realization of the recommended drive fashion, by referring to the foregoing relations stored in the storage device, and thereby presents the technique or clue to the driver, on the basis of the recommended drive fashion that has not been realized (step 108). For example, when although the center differential needs to be locked, the center differential lock actuation indicator lamp of the display system 26 is blinking and the switching to the locked state of the center differential has not been completed (when the DL indicator blinking request is on), the off-road guidance ECU 60 displays, as a guidance, characters that read "Please accelerate or decelerate, or reverse the vehicle" on the display system 66.

When the switching operation of the drive system to the recommended drive fashion is started, the off-road guidance ECU 60 activates a during-drive-switch-blinking counter. Then, within a predetermined time (e.g., 300 seconds) T2 after the switching operation of the drive system to the recommended drive fashion starts, the off-road guidance ECU 60 determines whether or not the switching of the drive system to the recommended drive fashion has been completed on the basis of whether or not there is a change in any of the signals that show the states of the actuators 28 and that are supplied from the 4WD-ECU 14 via the communication bus 19 (step 110). If, as a result, it is determined that the switching of the drive system to the recommended drive fashion was not completed within the predetermined time T2, the off-road guidance ECU 60 returns the selected mode of travel to the normal mode (step 112), and causes the display system 66 to indicate the normal mode by lighting display, and sends a mode signal showing that the present mode of travel is the normal mode, to the communication bus 19.

Besides, in the case where it is determined in step 102 that the drive system is in the recommended drive fashion, in the case where it is determined in step 106 or 108 that the switching of the drive system to the recommended drive fashion has been completed, the off-road guidance ECU 60 firmly determines the mode of travel to be the selected one, and causes the display system 66 to indicate that mode of travel by lighting display, and sends out the mode signal showing the mode of travel to the communication bus 19.

Thus, in the off-road guidance system 12 of this embodiment, the recommended drive fashion of the vehicle to be realized by operating the switches 20 to 24 in the drive system 12 is set separately for each of the modes of travel selected via the mode select switches 62. In the case where the drive system of the vehicle is not actually in the recommended drive fashion when the off-road guidance start switch 64 has been pressed, it is considered that the drive system needs to be switched to the recommended drive fashion, and therefore an operation method for the switches 20 to 24 is presented to the driver.

For example, in a situation where the deep snow/mud road mode has been selected as the mode of travel, if when the off-road guidance start switch 64 is pressed, the drive system of the vehicle is not in the recommended drive fashion as the transfer is in the L4 mode state or as the center differential is in the unlocked state, the characters that read "Please select H4L" are displayed as a guidance in the display system 66 so that the drive method of the drive system is set to the H4 mode and the center differential is set in the locked state, that is, so that the transfer switch 20 is selectively operated to the H4 mode state and the center differential lock switch 22 is selectively operated to the lock state.

With such a guidance display produced, it becomes easier for the driver to operate the switches 20 to 24 so as to realize a drive fashion (operational positions of the transfer, the center differential, and the rear differential) of the drive system that needs to be realized, for example, on a deep snow road or a desert road, by merely looking at the guidance display, even if the driver does not know which drive fashion needs to be realized. Therefore, according to the system of this embodiment, the recommended drive fashion of the drive system of the vehicle that matches the mode of travel selected via the mode select switches 62 can easily be realized by operating the switches 20 to 24, and therefore the realizability of the recommended drive fashion according to the selected mode of travel will improve.

Incidentally, in this embodiment, in the case where the drive system of the vehicle is in the drive fashion that is recommended for the selected mode of travel, there is no need for the driver to perform an operation of a switch, and therefore a guidance display as described above is not produced. Therefore, it is possible to prevent unnecessary performance of the guidance display, that is, the guidance display is performed only when needed, that is, when the drive system is not in the recommended drive fashion. Thus, the realizability of the recommended drive fashion will improve.

Furthermore, in the off-road guidance system 12 of this embodiment, if after the presentation of an operation method for the switches 20 to 24 to the driver is started in order to realize the recommended drive fashion as described above, the predetermined time T1 elapses from the starting time point of the presentation without completion of the switching to the drive system to the recommended drive fashion, then an operation method for the vehicle is presented to the driver so as to facilitate the realization of the recommended drive fashion. For example, when the switching of the center differential to the locked state is not completed although the center differential needs to be locked (when the request for the DL indicator blinking is on), the characters that read "Please accelerate or decelerate, or reverse the vehicle" are displayed as a guidance in the display system 66.

With such a guidance display produced, the driver can relatively easily carry out a vehicle operation that is to be performed in order to facilitate the realization of the recommended drive fashion of the drive system upon operation of the switches 20 to 24, by looking at the guidance display, even if the driver does not have an intuition or knack in the vehicle operation technique, for example, in the switching of the center differential from the unlocked state to the locked state. Therefore, according to the system of this embodiment, it is possible to facilitate the formation of a vehicle situation that is effective in realizing the recommended drive fashion of the drive system of the vehicle by operating the switches 20 to 24. Therefore, the realizability of the recommended drive fashion according to the selected mode of travel will further improve.

In this embodiment, if after an operation method for the switches 20 to 24 is presented to the driver in order to realize the recommended drive fashion, the predetermined time T2 elapses following the start of the switching operation of the drive system to the recommended drive fashion, without completion of the switching of the drive system to the recommended drive fashion, the selected mode of travel is automatically returned to the normal mode. This prevents a long-time continuation of a state (uncompleted state) where the drive system does not switch to the recommended drive fashion after an operation method for the switches 20 to 24 for realizing the recommended drive fashion commensurate with the mode of travel having been selected has been presented to the driver.

Besides, in this embodiment, if the off-road guidance start switch 64 is pressed when the vehicle speed is greater than a predetermined value, the off-road guidance ECU 60 does not accept the switching operation, but determines that the vehicle is not in such a state that the off-road guidance needs to be controlled and executed. If the vehicle speed is greater than a predetermined value during transition of the mode of travel after the control of the off-road guidance is started upon the pressing of the off-road guidance start switch 64, the selected mode of travel may be automatically returned to the normal mode. Besides, in this case, the off-road guidance ECU 60 may also display as a guidance, for example, the characters that read "Please stop the vehicle, and operate the off-road guidance start switch again" on the multi-purpose display, so as to prompt the driver to go through the off-road guidance again.

According to this construction, it is possible to prevent the occurrence of an event in which after the vehicle speed rises to a certain level, the drive system switches to the drive fashion recommended up to a time point immediately prior to the rising of the vehicle speed, and it is also possible to prompt a new off-road guidance.

With reference to FIGS. 8 and 9, an operation of the off-road guidance system 12 that is different from the foregoing basic operation thereof will be described. FIG. 8 shows a flowchart of an example of a control routine that the off-road guidance ECU 60 in the off-road guidance system 12 of this embodiment executes so as to realize the operation. FIG. 9 shows a diagram representing relations between the conditions for invalidating the input operation during the execution of the control of the off-road guidance and the contents to be displayed at the time of the invalidation, separately for each of the individual function switches 30 to 38 and 50 in the drive system 10.

In this embodiment, the VSC-ECU 16 and the power train ECU 18 each pre-store in their storage devices information regarding the presence/absence of the engagement permission for each of the VSC control, the A-TRC control, the damping force control of the shock absorber, and the second-speed start control, and the contents of the controls corresponding to the engagement permissions, separately for each of the modes of travel. For example, when the present mode of travel is the deep snow/mud road mode, the VSC control and the A-TRC control are both prohibited, and the normal mode of the damping force control is permitted, and the second-speed start control is permitted. On the other hand, when the present mode of travel is the desert mode, the VSC control, the A-TRC control and the second-speed start control are prohibited, and the normal mode of the damping force control is permitted.

Besides, the storage device of the VSC-ECU 16 pre-stores information regarding the presence/absence of the engagement permission for the crawl control and information regarding the set vehicle speed corresponding to the engagement permission therefor. For example, when the present mode of travel is the deep snow/mud road mode, the crawl control itself is prohibited. When the mode of travel is the snow/sand/mud climbing mode, the high mode of the crawl control is permitted to be engaged. When the mode of travel is the rock/stone mode, the low mode of the crawl control is permitted to be engaged.

Upon starting the off-road guidance control due to the selection of a mode of travel other than the normal mode, the off-road guidance ECU 60 sends a mode signal indicating the selected mode of travel, or a mode transition signal indicating that the mode of travel is in transition, to each of the ECUs 16, 18 via the communication bus 19.

When the ECUs 16, 18 are receiving the mode signal, or the mode signal indicating the mode of travel other than the normal mode, from the off-road guidance ECU 60 (when an affirmative determination is made in step 200), it is considered that the off-road guidance control is being executed, and therefore the ECUs 16, 18 invalidate the inputs of signal from the individual function switches 30 to 34, 50 (step 202). For example, the power train ECU 16 does not accept the switching-on operation of the second-speed start switch 50, even if the operation is performed. As a result, the VSC-ECU 16 maintains the stop of execution of the second-speed start control.

In the case where the ECUs 16, 18 receive the mode transition signal from the off-road guidance ECU 60 during the execution of a control related to the operation of any of the individual function switches 30 to 34, 50 (the VSC control, the A-TRC control, the damping force control of the shock absorber in the sport mode, and the second-speed start control), it is considered that the off-road guidance control has been started, and therefore the ECUs 16, 18 stop the controls related to the operations of the individual function switches 30 to 34, 50, and, from then on, invalidate the signal inputs that are made from the individual function switches 30 to 34, 50 (step 202).

In this construction, when the control of the off-road guidance is not executed, the input operations of the individual function switches 30 to 34, 50 become valid as in a usual operation, so that the on/off switching of the control by each of the input operations becomes possible. On the other hand, when the control of the off-road guidance is executed, the input operations of the individual function switches 30 to 34, 50 become invalid, so that the on/off switching of the control by each of the input operations becomes impossible.

In the case of receiving the mode signal indicating a mode of travel other than the normal mode from the off-road guidance ECU 60, each of the ECUs 16, 18 refers to the information regarding the presence/absence of the engagement permission for each of the VSC control, the A-TRC control, the damping force control of the shock absorber, and the second-speed start control in that mode of travel which is pre-stored in the storage device thereof, and divides the controls whose engagement is permitted during that mode of travel and the controls whose engagement is restricted during the mode of travel, and, from then on, executes the controls whose engagement is permitted, and maintains the restriction of the engagement of the controls whose engagement is restricted. For example, when the present mode of travel is the deep snow/mud road mode, the second-speed start control is executed.

In the foregoing construction, during the execution of the off-road guidance control after the switching of the drive system to the recommended drive fashion in relation with the selected mode of travel has been completed every time any one of the modes of travel is selected, the various controls of the drive system 10 (the VSC control, the A-TRC control, the damping force control of the shock absorber, and the second-speed start control) are executed with the predetermined control contents, or restricted from being executed, even if there is no input operation of any one of the individual function switches 30 to 34, 50.

Therefore, according to the system of this embodiment, during the execution of the off-road guidance control after the switching of the drive system to the recommended drive fashion in relation with the selected mode of travel that is other than the normal mode, the foregoing controls of the drive system 10 can be automatically executed or restricted from being executed according to the mode of travel, and the switching of control based on the input operations of the individual function switches 30 to 34, 50 can be prohibited.

Therefore, during the execution of the off-road guidance control, it is possible to prevent the occurrence of an event in which a travel state of the vehicle that is not very suitable for the mode of travel is brought about by the switching of control based on input operations of the individual function switches 30 to 34, 50, and to realize an optimum travel state that corresponds to the selected mode of travel. Furthermore, in this case, it is possible to make arrangement between the automatic switching of control associated with the selection of a mode of travel other than the normal mode and the manual switching associated with any of the input operations of the individual function switches 30 to 34, 50, and it is therefore possible to prevent the occurrence of control interference between the automatic switching and the manual switching.

Furthermore, in the case where the ECU 16 receives the mode signal indicating a mode of travel other than the normal mode from the off-road guidance ECU 60, the ECU 16 refers to the information regarding the presence/absence of the engagement permission for the crawl control which is pre-stored in the storage device, and determines whether or not the engagement of the crawl control is permitted with respect to the mode of travel indicated by the mode signal. Then, if an affirmative determination is made, the ECU 16 refers to the information regarding a set-vehicle speed mode of the crawl control which has been stored in the storage device, and selects the set-vehicle speed mode for the time of execution of the crawl control, and establishes a state in which the crawl control in the set-vehicle speed mode is permitted to be engaged. For example, when the mode of travel is the rock/stone mode, the crawl control in the low mode is permitted to be engaged.

In the case where the ECU 16 has received the mode signal indicating a mode of travel other than the normal mode from the off-road guidance ECU 60, the ECU 16 invalidates the signal inputs from the crawl dial switch 38, no matter which mode of travel is indicated by the signal. In the case where the indicated mode of travel is a mode that prohibits the engagement of the crawl control, the ECU 16 invalidates the signal inputs from the crawl main switch 36. On the other hand, when the mode of travel is a mode that permits the engagement of the crawl control, the ECU 16 validates the signal inputs from the crawl main switch 36.

In this construction, in the case where the selected mode of travel is a mode that permits the engagement of the crawl control, and where the switching of the drive system to the recommended drive fashion in relation with the mode of travel is completed, when during the following execution of the off-road guidance control the crawl main switch 36 is operated to the on-state, the crawl control will be executed in a set-vehicle speed mode that is pre-determined with respect to the mode of travel.

Hence, according to the system of the embodiment, in the case where the selected mode of travel is a mode that permits the engagement of the crawl control and where the switching of the drive system to the recommended drive fashion in relation with the mode of travel is completed, the switching of the crawl control based on the input operation of the crawl main switch 36 during the execution of the off-road guidance control that follows the completion of the switching to the recommended drive fashion, and thus the crawl control can be executed. Therefore, even during the execution of the off-road guidance control, the vehicle can be caused to travel at a constant low vehicle speed by the crawl control, depending on the selected mode of travel.

Incidentally, during the execution of the off-road guidance control, the input operation of the crawl dial switch 38 becomes invalid, and the mode switching of the crawl control by that input operation is prohibited. Therefore, the crawl control performed during the execution of the off-road guidance control is prevented from being arbitrarily set on the basis of the input operation of the crawl dial switch 38, and can be performed in an optimum mode that corresponds to the selected mode of travel.

In this embodiment, in a situation where the input operations of the individual function switches 30 to 38, 50 are invalid during the execution of the off-road guidance control as described above, when any of the individual function switches 30 to 38, 50 whose input operations are invalid is operated for input (step 204), the ECUs 16, 18 detects the operated one of the individual function switches 30 to 38, 50, and sends an operation prohibition signal indicating the identification information of that switch 30 to 38, 50 and indicating that the input operation of the switch is invalid, to the off-road guidance ECU 60 via the communication bus 19.

The storage device of the off-road guidance ECU 60 pre-stores relations between the conditions for invalidating the input operations of the switches 30 to 38, 50 and the contents to be displayed at the time of invalidation, separately for each of the individual function switches 30 to 38, 50, as shown in FIG. 9.

Upon receiving the operation prohibition signal from the ECUs 16, 18, the off-road guidance ECU 60 firstly specifically determines the one of the switches 30 to 38, 50 whose input operation is invalidated, on the basis of the identification information about the individual function switches 30 to 38, 50 that is contained in the operation prohibition signal. Then, on the basis of the specifically determined switch 30 to 38, 50 and the relation stored in the storage device, the off-road guidance ECU 60 specifically determines the content to be displayed for the individual function switch 30 to 38, 50 whose input operation has been invalidated, and displays the display content in the multi-purpose display of the display system 66, and thereby presents the content to the driver (step 206). For example, the characters that read "The switch cannot be operated because the off-road guidance is on" are displayed as a guidance.

Thus, according to the system of this embodiment, those of the individual function switches 30 to 38, 50 whose input operations are invalidated during the execution of the off-road guidance control so that the switching of control related to the switches is restricted can be notified to the driver via the multi-purpose display of the display system 66. Therefore, it becomes possible for the driver to know of one or more individual function switches 30 to 38, 50 having stopped to function during the execution of the off-road guidance control, by looking at the display screen.

Besides, the presentation to the driver an individual function switch 30 to 38, 50 whose input operation has been invalidated is performed only when the driver presses that individual function switch as an input operation, and is performed with respect to the one of the switches 30 to 38, 50 whose input operation has actually been performed. Therefore, it is possible to prevent excessive performance of such presentation of an individual function switch 30 to 38, 50 to the driver, and also prevent drawbacks (troublesomeness, or difficulty in understanding) associated with the simultaneous presentation of two or more of the switches 30 to 38, 50 irrespective of the presence/absence of an actual input operation.

Incidentally, in the foregoing embodiment, the transfer switch 20, the center differential lock switch 22, and the rear differential lock switch 24 may each be regarded as a "control switch" in the invention, and the drive method of the vehicle drive system, the center differential, and the rear differential may each be regarded as a "control state of the vehicle" in the invention, and the off-road guidance start switch 64 may be regarded as a "guidance switch" in the invention, and the predetermined time T1 may be regarded as a "first predetermined time" in the invention, and the predetermined time T2 may be regarded as a "second predetermined time" in the invention, and the normal mode may be regarded as a "usual mode of travel" in the invention.

Besides, in the foregoing embodiment, "control state switch means" in the invention may be realized by the 4WD-ECU 14 switching the drive method of the vehicle upon operation of the transfer switch 20, or switching the center differential of the vehicle between the locked state and the unlocked state upon operation of the center differential lock switch 22, or switching the rear differential of the vehicle between the locked state and the unlocked state upon operation of the rear differential lock switch 24. The off-road guidance ECU 60 selecting a mode of travel automatically or upon operation of the mode select switches 62 may realize "travel mode selection means" in the invention. Besides, the off-road guidance ECU 60 may realize "determination means" in the invention by executing the process of step 102 in the routine shown in FIG. 4, and may realize "switch operation method presentation means" in the invention by executing the process of step 104, and may realize "vehicle operation method presentation means" by executing the process of step 108.

Besides, in the foregoing embodiment, the individual function switches 30 to 38, 50 each may correspond to a "control switch" in the invention, and the switches 30 to 34, 38, 50 each correspond to a "first control switch" described in the claims for patent, and the crawl main switch 36 corresponds to a "switchable switch" in the invention, and the engagement permissions and the engagement restrictions of the VSC control, the A-TRC control, the damping force control of the shock absorber, the crawl control, and the second-speed start control each correspond to a "control state of the vehicle" in the invention.

In the foregoing embodiment, the ECUs 16, 18 may realize "manual control state switch means" in the invention by switching between the engagement permission and the engagement restriction of each control upon operation of one or more of the individual function switches 30 to 38, 50. Besides, the off-road guidance ECU 60 may realize "travel mode selection means" in the invention by selecting a mode of travel automatically or upon operation of the mode select switches 62. Furthermore, the ECUs 16, 18 may realize "automatic control state switch means" in the invention by switching between the engagement permission and the engagement restriction of each control by a command from the off-road guidance ECU 60. The ECUs 16, 18 may also realize "manual switching restriction means" in the invention by executing the process of step 202 in the routine shown in FIG. 8, and may realize "restriction switch notification means" in the invention by executing the process of step 206.

Incidentally, in the foregoing embodiment, the modes of travel that can be selected by the mode select switches 62 are six modes of travel, including the normal mode. However, it suffices to use at least two modes of travel, and a further mode, besides the six modes, may also be added and used.

Besides, in the foregoing embodiment, the individual function switches whose input operations are appropriately made invalid are the VSC stop switch 30, the A-TRC stop switch 32, the AVS switch 34, the crawl main switch 36, the crawl dial switch 38, and the second-speed start switch 50. However, a construction in which only one or more of those switches are used may also be adopted, or a further switch that performs another function may also be added and used.

Besides, in the foregoing embodiment, the off-road guidance is performed by displaying characters in the multi-purpose display of the display system 66. However, the off-road guidance may also be performed by displaying on the multi-purpose display, for example, a picture or a solid figure of the transfer, arrows indicating the recommended drive fashion or position in which the transfer needs to be set, or the operating direction, etc.

Besides, although in the foregoing embodiment, the off-road guidance is visually performed by using the multi-purpose display of the display system 66, the off-road guidance may also be aurally performed by using a speaker independently or in combination with the simultaneous use of the visual display. For example, a guidance of "Please select L4L" or the like may be produced aurally, and furthermore a guidance of "Please set the transfer to the L4 mode, and set the center differential lock switch to the locked state" or the like may also be aurally produced.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention claimed is:

1. A vehicle control device comprising:
a manual control state switch portion that switches a control state of a vehicle upon operation of at least one control switch including a vehicle stability control (VSC) stop switch, an automatic traction control (A-TRC) stop switch, a second-speed start switch, and an anti-vibration system (AVS) switch, the VSC being a control of securing stability of a cornering behavior of the vehicle, the A-TRC being a control of securing behavior stability at a time of acceleration associated with an accelerator operation, and the AVS being a control of a damping force control of a shock absorber;
a travel mode selection portion that selects a mode of travel for a travel of the vehicle;
an automatic control state switch portion that automatically switches the control state of the vehicle when the travel mode selection portion selects a first mode of travel other than a usual mode of travel, the first mode of travel being a mode for off-road travel; and
a manual switching restriction portion that restricts the manual control state switch portion from switching the control state of the vehicle upon operation of a first control switch that is one of the at least one control switch, if the first mode of travel has been selected by the travel mode selection portion.

2. The vehicle control device according to claim 1, wherein even when the first mode of travel has been selected by the travel mode selection portion, the manual control state switch portion is allowed to switch the control state of the vehicle upon operation of a switchable switch that is one of the at least one control switch other than the first control switch.

3. The vehicle control device according to claim 1, further comprising a restriction switch notification portion that informs the driver of the first control switch when switching of the control state by the manual control state switch portion is restricted by the manual switching restriction portion.

4. The vehicle control device according to claim 3, wherein the restriction switch notification portion informs the driver of the first control switch when the first control switch is operated.

5. The vehicle control device according to claim 2, wherein the switchable switch includes a crawl main switch for selecting a crawl control, and the first control switch includes a crawl dial switch for setting vehicle speed during crawl.

6. The vehicle control device according to claim 1, wherein the travel mode selection portion is a portion other than the VSC stop switch, the A-TRC stop switch, the second-speed start switch, and the AVS switch.

7. A vehicle control device comprising:
circuitry configured to:
switch a control state of a vehicle upon operation of at least one manual control switch including a vehicle stability control (VSC) stop switch, an automatic traction control (A-TRC) stop switch, a second-speed start switch, and an anti-vibration system (AVS) switch, the VSC being a control of securing stability of a cornering behavior of the vehicle, the A-TRC being a control of securing behavior stability at a time of acceleration associated with an accelerator operation, and the AVS being a control of a damping force control of a shock absorber;
accept selection of a mode of travel for a travel of the vehicle;
automatically switch the control state of the vehicle when selection of a first mode of travel other than a usual mode of travel is accepted, the first mode of travel being a mode for off-road travel; and
restrict the switching of the control state of the vehicle upon operation of a first control switch, that is one of the at least one manual control switch, if the first mode of travel has been selected.

* * * * *